2,714,594

HALOBENZOATES OF 1,2,3,4-TETRAHYDROISO-QUINOLINEALKANOLS

John W. Cusic, Skokie, Ill., assignor to G. D. Searle & Co., Chicago, Ill., a corporation of Illinois No Drawing. Application January 13, 1954,
Serial No. 403,910

8 Claims. (Cl. 260—287)

The present invention relates to a new group of halobenzoates of certain heterocyclic alcohols and, more particularly, to halobenzoates of 1,2,3,4-tetrahydroisoquinolinealkanols, their derivatives and salts, and to methods for their preparation. The compounds which constitute my invention can be represented as the bases of the general structural formula

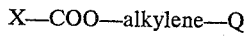

and their salts wherein X is a haloaryl radical and Q is a 2-(1,2,3,4-tetrahydro)isoquinoline radical which may be substituted at the carbon atoms of the nitrogen-containing ring by a lower alkyl or a phenyl radical.

In the foregoing structural formula, the radical X represents a halogenated derivative of a phenyl or a lower alkylated phenyl radical such as fluorophenyl, chlorophenyl, bromophenyl, iodophenyl, fluorotolyl, dichloroxylyl, dibromocumyl, diiodobutylphenyl and the like. The radical Q is a 1,2,3,4-tetrahydroisoquinoline radical attached to the alkylene radical in the formula above at the nitrogen atom; this tetrahydroisoquinoline radical can be further substituted, preferably in the Py-ring, by a phenyl or a lower alkyl radical such as methyl, ethyl, straight and branched chain propyl, butyl, amyl, and hexyl. The alkylene radical in the foregoing structural formula is derived from such divalent, straight-chained or branched-chained hydrocarbon radicals as ethylene, propylene, butylene, amylene, hexylene, or polymethylene radicals such as trimethylene, tetramethylene, pentamethylene, and hexamethylene.

The organic bases described herein form salts which are non-toxic in therapeutic dosage with a variety of inorganic and strong organic acids, including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The compounds of my invention are valuable as intermediates in organic synthesis and as medicinal substances particularly because of their effect on the cardiovascular system. They produce a regulatory effect on abnormal heart rhythm. Further, they act as antagonists in hypertension and vasoconstriction. They also furnish active ingredients in parasiticidal compositions of matter.

My invention will appear more fully from the following examples which are set forth for the purpose of illustration only but are in no way to be construed as limiting in spirit or in scope. In these examples quantities of materials are expressed in parts by weight and temperatures in degrees centigrade (° C.).

Example 1

A mixture of 175 parts of o-chlorobenzoyl chloride and 177 parts of 1,2,3,4-tetrahydroisoquinoline-2-ethanol in 1200 parts of butanone is refluxed for an hour. After cooling, the precipitate is collected on a filter and crystallized from dilute isopropanol. The hydrochloride of 2-[β-(o-chlorobenzoyloxy)ethyl] - 1,2,3,4 - tetrahydroisoquinoline thus obtained melts at about 173–174° C.

Example 2

On mixing of 175 parts of p-chlorobenzoyl chloride and 177 parts of 1,2,3,4-tetrahyroisoquinoline-2-ethanol in 1200 parts of butanone, a solid precipitate forms. The mixture is warmed at 60° C. for 2 hours and then permitted to stand for 12 hours. The crystalline precipitate is collected on a filter and recrystallized from dilute isopropanol. The hydrochloride of 2-[β-(p-chlorobenzoyloxy)ethyl]-1,2,3,4-tetrahydroisoquinoline thus obtained melts at about 206–207° C.

Example 3

A mixture of 505 parts of p-iodobenzoyl chloride and 382 parts of 3-methyl-1,2,3,4-tetrahydroisoquinoline-2-ethanol in 3000 parts of butanone is refluxed for 3 hours and then cooled. The precipitate is collected on a filter and dissolved in water. The aqueous solution is washed with ether, rendered alkaline by addition of dilute aqueous potassium hydroxide solution and extracted with ether. The ether extract is dried over anhydrous sodium sulfate, filtered and evaporated to yield 2-[β-(p-iodobenzoyloxy)-ethyl]-3-methyl-1,2,3,4-tetrahydroisoquinoline. It has the structural formula

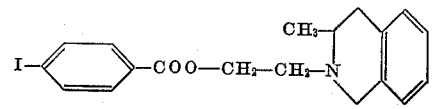

Example 4

A mixture of 203 parts of o-chloro-p-ethylbenzoyl chloride and 191 parts of 1,2,3,4-tetrahydroisoquinoline-2-propanol in 1200 parts of butanone is warmed for 90 minutes. After cooling, the precipitate is collected on a filter and dissolved in water. The aqueous solution is rendered alkaline by addition of dilute sodium hydroxide solution and extracted with ether. This ether extract is dried over anhydrous magnesium sulfate, stirred with charcoal, filtered and evaporated to yield 2-[γ-(o-chloro-p-ethylbenzoyloxy)propyl]-1,2,3,4-tetrahydroisoquinoline.

Example 5

On stirring of 209 parts of o,p-dichlorobenzoyl chloride, 177 parts of 1,2,3,4-tetrahydroisoquinoline-2-ethanol and 1200 parts of butanone, a heavy precipitate forms. After warming for 90 minutes at 60° C., the mixture is cooled and the hydrochloride of 2-[β-(o,p-dichlorobenzoyloxy)ethyl]-1,2,3,4-tetrahydroisoquinoline is collected on a filter. Recrystallized from dilute isopropanol, it melts at about 215–216° C.

Example 6

On mixing of 209 parts of m,p-dichlorobenzoyl chloride, 177 parts of 1,2,3,4-tetrahydroisoquinoline-2-ethanol and 1200 parts of butanone, a heavy solid material precipitates. After warming for 90 minutes and cooling, the solid material is collected on a filter and recrystallized from dilute isopropanol. The hydrochloride of 2-[β-(m,p-dichlorobenzoyloxy)ethyl] - 1,2,3,4 - tetrahydroisoquinoline thus obtained melts at about 206–207° C.

I claim:
1. A compound of the structural formula

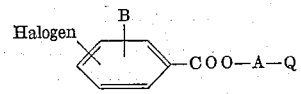

wherein A is a lower alkylene radical, B is a member of the class consisting of halogen, hydrogen, and lower alkyl radicals and Q is a 2-(1,2,3,4-tetrahydro)isoquinoline radical containing attached to the carbon atoms of the nitrogen-containing ring members of the class consisting of hydrogen, lower alkyl and phenyl radicals.

2. A compound of the structural formula

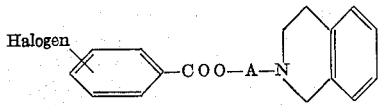

wherein A is a lower alkylene radical.

3. A compound of the structural formula

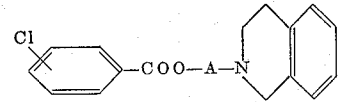

wherein A is a lower alkylene radical.

4. 2-[β-(o-chlorobenzoyloxy)ethyl]-1,2,3,4-tetrahydroisoquinoline.
5. 2-[β-(p-chlorobenzoyloxy)ethyl]-1,2,3,4-tetrahydroisoquinoline.
6. A compound of the structural formula

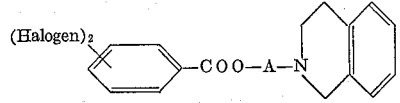

wherein A is a lower alkylene radical.

7. 2-[β-(o,p-dichlorobenzoyloxy)ethyl]-1,2,3,4-tetrahydroisoquinoline.
8. 2-[β-(m,p-dichlorobenzoyloxy)ethyl] - 1,2,3,4-tetrahydroisoquinoline.

No references cited.